United States Patent
Yamaguchi et al.

(10) Patent No.: US 9,616,571 B2
(45) Date of Patent: Apr. 11, 2017

(54) ROBOT, CONTROL APPARATUS, ROBOT SYSTEM, AND CONTROL METHOD

(71) Applicant: Seiko Epson Corporation, Tokyo (JP)

(72) Inventors: Yukihiro Yamaguchi, Matsumoto (JP); Taro Ishige, Matsumoto (JP)

(73) Assignee: Seiko Epson Corporation (JP)

( * ) Notice: Subject to any disclaimer, the term of this patent is extended or adjusted under 35 U.S.C. 154(b) by 60 days.

(21) Appl. No.: 14/532,366

(22) Filed: Nov. 4, 2014

(65) Prior Publication Data
US 2015/0127153 A1    May 7, 2015

(30) Foreign Application Priority Data

Nov. 5, 2013 (JP) .................. 2013-229059

(51) Int. Cl.
*B25J 9/16* (2006.01)

(52) U.S. Cl.
CPC .......... *B25J 9/1692* (2013.01); *B25J 9/1697* (2013.01); *G05B 2219/39012* (2013.01); *G05B 2219/39343* (2013.01); *G05B 2219/39391* (2013.01); *G05B 2219/39394* (2013.01); *Y10S 901/02* (2013.01); *Y10S 901/28* (2013.01)

(58) Field of Classification Search
CPC .............. B25J 9/1692; B25J 9/1612; B25J 9/1638–9/1641; B25J 9/1653; B25J 13/08–13/085; B25J 15/02; B25J 17/00; G05B 2219/39012–2219/39057; G05B 19/401–19/4015; G05B 19/404; Y10S 901/28; Y10S 901/02; Y10S 901/30; Y10S 901/33; Y10S 901/46–901/47; Y10S 901/50

USPC .......... 700/254, 258, 259; 901/2, 28, 30, 33, 901/46, 47, 50; 318/568.16, 568.22
See application file for complete search history.

(56) References Cited

U.S. PATENT DOCUMENTS

| | | | | |
|---|---|---|---|---|
| 6,070,109 A * | 5/2000 | McGee | ............... | B25J 9/1692 700/254 |
| 6,304,050 B1 * | 10/2001 | Skaar | ............... | B25J 9/1692 318/568.11 |
| 8,170,715 B1 * | 5/2012 | Vallapuzha | ............ | F16L 55/265 138/97 |

(Continued)

FOREIGN PATENT DOCUMENTS

JP     2003-311670 A    11/2003

OTHER PUBLICATIONS

Nammoto et al., "Model-Based Compliant Motion Control Scheme for Assembly Tasks Using Vision and Force Information", 2013 IEEE International Conference on Automation Science and Engineering, Madison, Wisconsin, pp. 948-953 (Aug. 17, 2013).

(Continued)

*Primary Examiner* — Bao Long T Nguyen
(74) *Attorney, Agent, or Firm* — Harness, Dickey & Pierce, P.L.C.

(57) ABSTRACT

A robot performs, after i-th (i is a natural number) work, i+1-th work different from the i-th work and performs, after j-th (j is a natural number satisfying j≠i) work, j+1-th work different from the j-th work. The robot performs the i+1-th work after the i-th work without changing information concerning correction in a joint of the robot during the i-th work, performs robot calibration after the j-th work, and performs the j+1-th work after performing the robot calibration.

6 Claims, 7 Drawing Sheets

(56) References Cited

U.S. PATENT DOCUMENTS

| | | | |
|---|---|---|---|
| 2004/0162625 A1 | 8/2004 | Herrmann et al. | |
| 2008/0027580 A1 | 1/2008 | Zhang et al. | |
| 2008/0039973 A1* | 2/2008 | Ueno | B25J 9/1623 |
| | | | 700/245 |
| 2009/0037022 A1* | 2/2009 | Teaford | B25J 9/1641 |
| | | | 700/254 |
| 2009/0190826 A1* | 7/2009 | Tate | G06T 7/0042 |
| | | | 382/153 |
| 2010/0101346 A1* | 4/2010 | Johnson | B25J 9/1641 |
| | | | 74/405 |
| 2013/0054029 A1* | 2/2013 | Huang | B25J 5/005 |
| | | | 700/259 |
| 2013/0131865 A1* | 5/2013 | Yamane | B25J 9/1692 |
| | | | 700/254 |
| 2013/0147944 A1 | 6/2013 | Zhang et al. | |
| 2013/0274921 A1 | 10/2013 | Aiso | |
| 2014/0018957 A1* | 1/2014 | Matsumoto | B25J 9/1697 |
| | | | 700/251 |
| 2014/0343727 A1* | 11/2014 | Calkins | B25J 9/1692 |
| | | | 700/248 |
| 2015/0120055 A1* | 4/2015 | Miyazawa | B25J 9/1697 |
| | | | 700/259 |

OTHER PUBLICATIONS

Extended European Search Report for Patent Application No. EP14191451.5, dated May 9, 2016 (8 pages).

* cited by examiner

ROBOT, CONTROL APPARATUS, ROBOT SYSTEM, AND CONTROL METHOD

BACKGROUND

1. Technical Field

The present invention relates to a robot, a control apparatus, a robot system, a control method, and the like.

2. Related Art

Currently, in calibration of a robot, a position and a posture for performing work are determined. Positioning at high accuracy in the position and the posture is realized. If work to be performed by the robot changes, it is necessary to realize positioning at high accuracy according to the work. Therefore, the calibration needs to be performed again. For example, when causing one robot to perform ten kinds of work, it is necessary to perform the calibration ten times. Therefore, when it is attempted to strictly perform the calibration every time work is changed, an extremely long time is required.

Therefore, for example, as described in JP-A-2003-311670 (Patent Literature 1), it is conceivable to use visual servo in order to control a position posture of an arm at high accuracy even if calibration is not strictly performed. When the calibration is strictly performed, the calibration sometimes takes a full day. On the other hand, simplified calibration is sometimes finished within one hour. Therefore, it is possible to reduce time required for the calibration by using the visual servo.

However, in a site of manufacturing of various kinds of products, there are many kinds of work to be performed by a robot and the kinds of work are frequently changed. Therefore, even when the simplified calibration is performed, if the calibration is performed every time work to be performed by the robot is changed, time and man-hour increase. Productivity in the site of the manufacturing of various kinds of products is hindered.

SUMMARY

An aspect of the invention relates to a robot that performs, after i-th (i is a natural number) work, i+1-th work different from the i-th work and performs, after j-th (j is a natural number satisfying j≠i) work, j+1-th work different from the j-th work. The robot performs the i+1-th work after the i-th work without changing information concerning correction in a joint of the robot during the i-th work, performs robot calibration after the j-th work, and performs the j+1-th work after performing the robot calibration.

In the aspect of the invention, even when the robot performs different work after predetermined work, the robot does not perform calibration when it is unnecessary to perform the calibration. Therefore, even in the case of manufacturing of various kinds of products in which it is necessary to perform the calibration every time work is changed in the method in the past, it is possible reduce a processing load concerning the calibration and improve productivity.

In the aspect of the invention, after the i-th work, the robot may perform the i+1-th work by picking up images of an image pickup target object a plurality of times when the robot shifts from a first posture to a second posture different from the first posture.

With this configuration, it is possible to, for example, perform the i+1-th work different from the i-th work by picking up images of the image pickup target object a plurality of times.

In the aspect of the invention, the robot may include an end effector provided with a force sensor, and after the i-th work, the robot may perform the i+1-th work by bringing the end effector into contact with an object while the robot shifts from a first posture to a second posture different from the first posture.

With this configuration, it is possible to, for example, perform the i+1-th work different from the i-th work by bringing the end effector provided with the force sensor into contact with the object.

Another aspect of the invention relates to a control apparatus that actuates a robot that performs, after i-th (i is a natural number) work, i+1-th work different from the i-th work and performs, after j-th (j is a natural number satisfying j≠i) work, j+1-th work different from the j-th work. The control apparatus causes the robot to perform the i+1-th work after the i-th work without changing information concerning correction in a joint of the robot during the i-th work, perform robot calibration after the j-th work, and perform the j+1-th work after performing the robot calibration.

In the another aspect of the invention, even when the robot performs different work after predetermined work, the robot does not perform calibration when it is unnecessary to perform the calibration. Therefore, even in the case of manufacturing of various kinds of products in which it is necessary to perform the calibration every time work is changed in the method in the past, it is possible reduce a processing load concerning the calibration and improve productivity.

Still another aspect of the invention relates to a robot system including a robot that performs, after i-th (i is a natural number) work, i+1-th work different from the i-th work and performs, after j-th (j is a natural number satisfying j≠i) work, j+1-th work different from the j-th work. The robot performs the i+1-th work after the i-th work without changing information concerning correction in a joint of the robot during the i-th work, performs robot calibration after the j-th work, and performs the j+1-th work after performing the robot calibration.

In the still another aspect of the invention, even when the robot performs different work after predetermined work, the robot does not perform calibration when it is unnecessary to perform the calibration. Therefore, even in the case of manufacturing of various kinds of products in which it is necessary to perform the calibration every time work is changed in the method in the past, it is possible reduce a processing load concerning the calibration and improve productivity.

Yet another aspect of the invention relates to a control method for performing, after i-th (i is a natural number) work, i+1-th work different from the i-th work and performing, after j-th (j is a natural number satisfying j≠i) work, j+1-th work different from the j-th work. The control method causes the robot to perform the i+1-th work after the i-th work without changing information concerning correction in a joint of the robot during the i-th work, perform robot calibration after the j-th work, and perform the j+1-th work after performing the robot calibration.

In the yet another aspect of the invention, even when the robot performs different work after predetermined work, the robot does not perform calibration when it is unnecessary to perform the calibration. Therefore, even in the case of manufacturing of various kinds of products in which it is necessary to perform the calibration every time work is changed in the method in the past, it is possible reduce a processing load concerning the calibration and improve productivity.

As explained above, according to the several aspects of the invention, it is possible to provide the robot, the control apparatus, the robot system, the control method, and the like that reduce a processing load concerning calibration by skipping the calibration according to a situation even when different work is performed after predetermined work.

BRIEF DESCRIPTION OF THE DRAWINGS

The invention will be described with reference to the accompanying drawings, wherein like numbers reference like elements.

DESCRIPTION OF EXEMPLARY EMBODIMENTS

Figure 1:
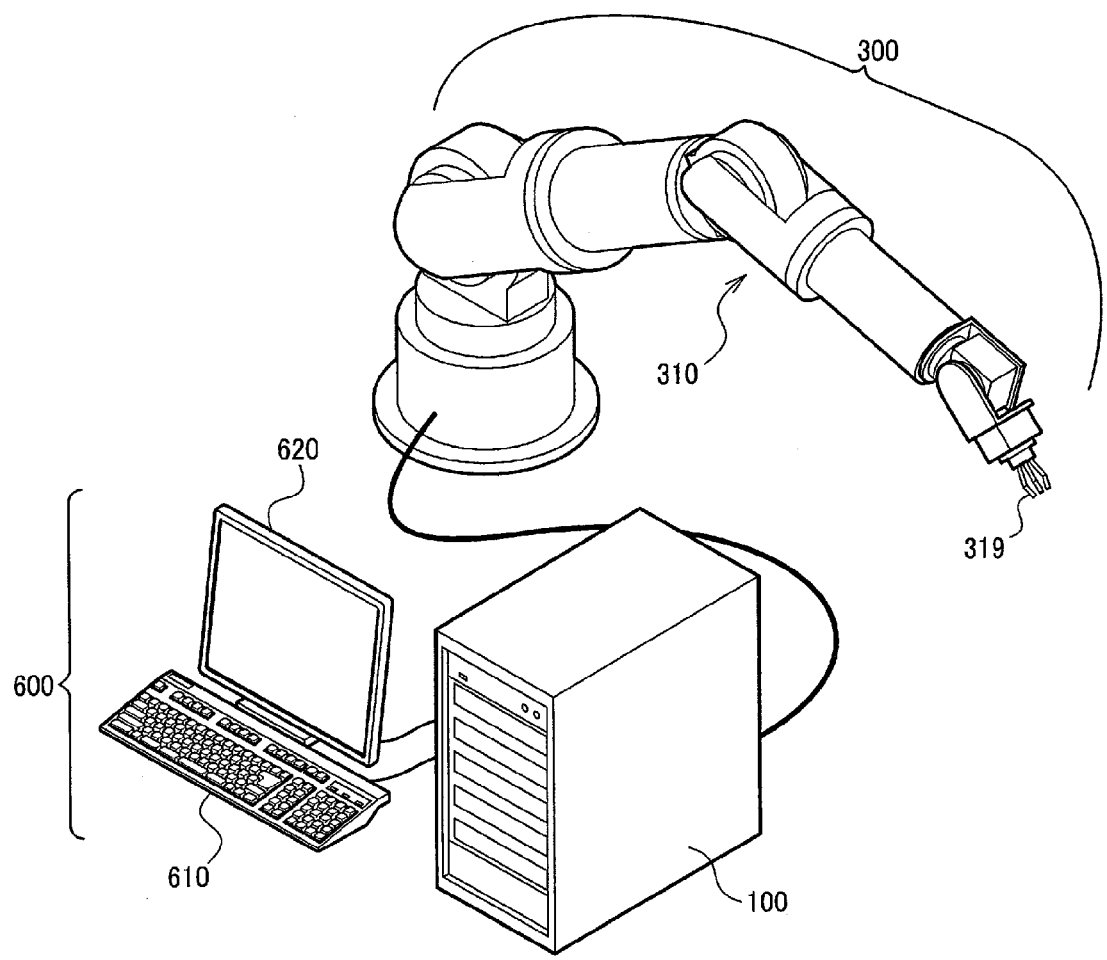
FIG. 1 is a configuration example of a robot according to an embodiment.

An embodiment is explained below. Note that the embodiment explained below does not unduly limit contents of the invention described in the appended claims. Not all components explained in the embodiment are always essential constituent elements of the invention.

1. Method in this Embodiment

First, a method in this embodiment is explained. When work by a robot is performed, positioning accuracy of the robot, that is, how accurately a finger (a hand) or the like can be moved to a target position posture greatly affects work to be performed. Ideally, if a model of the robot is determined, a finger position posture can be uniquely calculated according to the model. The model is information such as the length of a frame (a link) provided between two joints and the structure of a joint (e.g., a rotating direction of the joint and presence or absence of offset).

However, the robot includes various errors. Specifically, as error factors of the robot, a geometrical error factor and a non-geometrical error factor are conceivable. The former is, for example, deviation of the length of a link and the latter is, for example, a bend due to the gravity. Because of these error factors, when control for causing the robot to take a predetermined posture (e.g., control for determining angles of joints) is performed, a finger position in a robot base coordinate system (an ideal space) and a finger position in a robot finger coordinate system (a measurement space) have different values.

As measures against this problem, robot calibration for correcting deviation due to the error factors is widely used. The robot calibration means calibration in which a user actuates the robot using a teaching pendant or the like according to a manufacturer's manual or the like to correct a joint of the robot. The robot calibration does not include calibration in which the robot itself makes determination, moves, and corrects a joint of the robot itself. Details of the robot calibration are explained below. For example, processing for calculating a correspondence relation between the robot base coordinate system and the robot finger coordinate system only has to be performed. If it is seen how conversion is performed between the two coordinate systems (spaces), a correspondence relation between control parameters of a joint angle or the like and the robot finger coordinate system is seen. Therefore, it is possible to accurately calculate to which position fingers of the robot actually move (in the measurement space) according to what kind of robot control.

However, a correspondence relation between the robot finger coordinate system and the robot base coordinate system (e.g., a conversion parameter such as a matrix for performing coordinate conversion) is generally different according to a position. For example, since an arm bends more largely when the arm is extended compared with when the arm is folded short, an error caused by a bend due to the gravity increases when the arm is extended. That is, if a state of the arm and a finger position determined by the state change, the error changes and the correspondence relation between the two coordinate systems representing the error also changes.

Therefore, different positions of N points (in a broad sense, N regions) are conceivable as the finger position of the robot. If calibration at high accuracy is performed in all the positions, basically, it is necessary to generate and store N conversion parameters. Since the fingers of the robot can take an extremely larger number of positions, it is unrealistic to execute calibration at high accuracy that can cope with all the finger positions.

As a result, even in the robot in the past, robot calibration by a robot manufacturer is performed before shipment. However, after the robot is set in a work environment by a user, the robot calibration by the user needs to be performed again. Specifically, processing for calculating conversion parameters at high accuracy for determining a finger position in work desired by the user and correcting an error in the finger position is performed. However, the robot calibration requires expert knowledge. In particular, calibration at high accuracy (e.g., accuracy in millimeter or smaller order of an error after the calibration) imposes a large burden on the user.

That is, in the method in the past, except when the same work is continuously performed for the same target object, it is necessary to always perform the calibration at high accuracy. Therefore, the applicant proposes a method of not performing (skipping) calibration according to a situation by using, for example, control performed by a plurality of times of image pickup by an image pickup unit (in a narrow sense, visual servo control). Like a human can perform fine adjust of a way of moving the arms or the hands while viewing a work state with the eyes, in the visual servo control, since a result of image processing for a picked-up image is fed back, even if the finger position deviates from a target position, it is possible to recognize and correct the deviation. Usually, if the calibration is skipped, deviation occurs (it is difficult to move the fingers to the target position at high accuracy). However, it is possible to correct the deviation by using the visual servo control.

Note that Patent Literature 1 discloses that "even if the calibration is not strictly performed, it is possible to accurately and quickly control the position posture of the robot arm". However, this is considered to mean that accuracy may be low in performing the calibration and is not considered to clearly indicate that the calibration itself is skipped.

Further, the applicant assumes a robot with high versatility capable of executing various kinds of work on various workpieces using various tools. As a result, the robot assumed by the applicant is used for manufacturing of various kinds of products (in a narrow sense, manufacturing in a small amount for one kind). If a target object of work changes, a work environment such as a workbench also changes and a work position (a finger position in the work) also changes. Therefore, as explained above, when the work changes, it is assumed that sufficient accuracy cannot be attained using a calibration result before the change. In the method in the past, it is necessary to always execute the calibration again in such a case. Therefore, in the robot that performs manufacturing of variety of kinds of products, a burden concerning the calibration is extremely large.

In view of the above, the applicant proposes a robot that performs, after i-th (i is a natural number) work, i+1-th work different from the i-th work and performs, after j-th (j is a natural number satisfying j≠i) work, j+1-th work different from the j-th work. The robot performs the i+1-th work after the i-th work without changing information concerning correction in a joint of the robot during the i-th work, performs robot calibration after the j-th work, and performs the j+1-th work after performing the robot calibration. For example, the robot may be a robot that performs a plurality of kinds of work including at least two or more kinds of work. The robot includes, as shown in FIG. 1, a robot mechanism 300 (in an example shown in FIG. 1, an arm 310 and an end effector 319) and a robot control unit 100. After k-th (k is a natural number) work among the plurality of kinds of work, when the robot control unit 100 performs k+1-th work different from the k-th work, if calibration is unnecessary, the robot control unit 100 performs, without performing the calibration, the k+1-th work according to robot control by a plurality of times of image pickup by the image pickup unit during robot work. If the calibration is necessary, after performing the calibration, the robot control unit 100 performs the k+1-th work according to the robot control by a plurality of times of image pickup by the image pickup unit during robot work.

In the above explanation, i is a natural number. When work of the robot is configured from first work to N-th (N is an integer equal to or larger than 2) work, i is an integer satisfying 1≤i≤N−1. When a natural number s and a natural number t satisfy a relation s<t, it is assumed that t-th work is executed later than s-th work in time series. That is, the i+1-th work is work performed following the i-th work. The same holds true concerning the natural numbers j and k.

Respective kinds of work in the plurality of kinds of work are work repeatedly performed by the robot. A series of flows of a pre-processing process, a processing process, and a post-processing process is one kind of work. The pre-processing process is a process before the processing process and is, for example, a process for moving a workpiece used in the processing process from a first placing area of the workpiece to a work space such as a workbench. As placing methods for the workpiece in the first placing area, there are, for example, pallet placing, bulk placing, and bin placing. The processing process is a process for applying processing to the workpiece moved in the pre-processing process. When there are two or more workpieces, in the processing process, for example, processing for assembling the workpieces, fitting one workpiece in the other workpiece, or inserting one workpiece into the other workpiece is performed. Further, for example, processing for combining the workpieces using fasteners such as screws is performed. On the other hand, when there are one workpiece, in the processing process, for example, processing for bending the workpiece is performed. The post-processing process is a process performed after the processing process and is, for example, a process for placing, in a second placing area, a finished product in the processing process such as an assembled product obtained by assembling the two workpieces or a combined product obtained by combining the workpieces using the screws. Note that, in this embodiment, only processing for assembling the workpieces or fitting one workpiece in the other workpiece does not correspond to one kind of work.

The i-th work and the i+1-th work are different at least in a part of process content of any one of the pre-processing process, the processing process, and the post-processing process. For example, work including the processing for "assembling the workpieces" in the processing process and work including the processing for "fitting one workpiece in the other workpiece" in the processing process are considered to be different kinds of work. Work for "assembling a workpiece A and a workpiece B placed in bulk and placing the assembled workpiece in the second placing area" and work for "assembling the workpiece A and a workpiece C of a kind different from the workpiece B and placing the assembled workpiece in the second placing area" are considered to be different kinds of work. Further, even work including the processing for "combining the workpieces using the screws" in the processing process is different work, for example, when workpieces to be combined are different or when workpieces to be combined are the same but positions where the screws are inserted are different.

The operation of the robot performed by picking up images of an image pickup target object a plurality of times while the robot shifts from a first posture to a second posture different from the first posture may be realized by the visual servo control. The visual servo control is control for performing comparison processing for a picked-up image from the image pickup unit and a reference image (a goal image) representing a goal state of work and performing feedback control for reducing a difference between the two images. By performing the visual servo control, the present state (a state picked up in a picked-up image) and a goal state gradually come close to each other. Finally, it is possible to realize the goal state. In the visual servo control, parameters such as a joint angle are gradually updated to approach the goal state. Unlike a method of changing parameters to fixed target values as in position control, it is possible to bring the parameters close to an appropriate direction while viewing the present state. Therefore, it is possible to perform positioning at high accuracy. However, the robot control by a plurality of times of image pickup by the image pickup unit is not limited to the visual servo control. The robot control may be, for example, robot control based on recognition by pattern matching.

Consequently, even when, after i-th work, i+1-th work different from the i-th work is performed, it is possible to perform appropriate robot control. Timing of a change from the i-th work to the i+1-th work is timing when content in any one process among the pre-processing process, the processing process, and the post-processing process changes and is timing when it is likely that a problem occurs in accuracy if calibration information concerning a joint of the robot up to that point (which is a calibration result and may be, for example, a conversion parameter representing a correspondence relation between a robot base coordinate system and a robot finger coordinate system used in the i-th work) is directly used. In this case, in the method in the past, there is no alternative but to always execute calibration. However, in the method in this embodiment, it is possible to skip the calibration.

When the calibration is skipped, it is highly likely that an error occurs because, for example, a result of the calibration calculated before the skipping of the calibration is directly used. However, in this embodiment, the error is absorbed by, for example, the visual servo control. In a site of production of various kinds in small quantities, work is changed at a high frequency, that is, in the method in the past, the calibration is performed again at a high frequency. However, in the method in this embodiment, since the calibration can be omitted, a processing load is reduced.

For example, the robot according to this embodiment may include an end effector provided with a force sensor. After the i-th work, the robot may perform the i+1-th work by bringing the end effector into contact with an object at least while the robot shifts from a first posture to a second posture different from the first posture.

Figure 9:
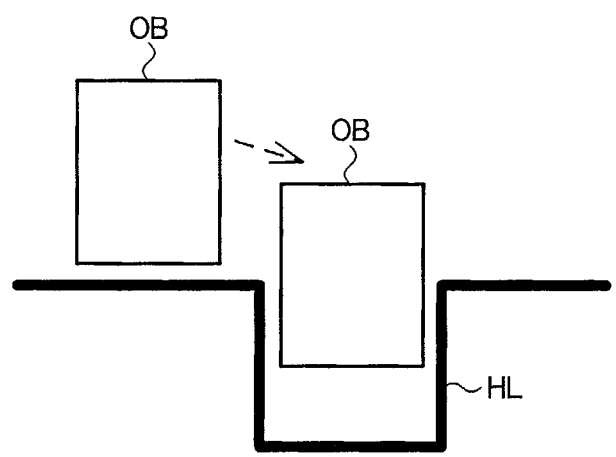
FIG. 9 is an example of force control.

The operation of the robot performed by bringing the end effector provided with the force sensor into contact with the object may be realized by force control such as impedance control for detecting, as a force sense value, an external force acting on the end effector of the robot. For example, as shown in FIG. 9, when work for fitting an object OB gripped by the end effector in a hole section HL is assumed, in position control, information concerning the position of the hole section HL is acquired in advance and the arm of the robot is moved to match the position. Therefore, when an error occurs in a finger position because the robot calibration is omitted, the object OB cannot be appropriately fit in the hole section HL. In that regard, according to the force control, as shown in FIG. 9, after rough positioning, it is also possible to perform positioning by searching and fit the object OB in the hole section HL. That is, work can be completed even if accuracy of the positioning itself is somewhat low. Therefore, it is possible to perform the i+1-th work without changing calibration information in a joint of the robot during the i-th work.

Note that, in the following explanation, it is assumed that the visual servo control is used when the robot calibration is omitted. However, a plurality of times of image pickup of the image pickup target object may be realized by control other than the visual servo control. In the first place, like the operation of the robot performed by bringing the end effector provided with the force sensor into contact with the object rather than picking up images of the image pickup target object a plurality of times, the omission of the robot calibration may be realized by using other methods. The following explanation can be considered to be expanded to those methods.

Note that whether calibration is necessary may be determined by the user or may be automatically determined on the robot side. The user can easily determine, through visual observation or the like, whether the robot is performing a desired operation. Therefore, the robot only has to receive a determination result in an interface unit 600 or the like and skip or execute the calibration according to the determination result. Alternatively, the robot may acquire a picked-up image or sensor information to automatically determine whether the robot is performing an operation desired by the user. A method of the robot automatically determining whether the calibration is necessary is explained below. Both of the user and the robot may perform the determination. For example, the robot may automatically perform the determination, present a result to the user, and leave final determination to the user.

In the following explanation, detailed system configuration examples of the robot, the control apparatus, and the like according to this embodiment are explained. Then, details of calibration are explained. Specifically, details of the robot calibration and camera calibration performed for a camera are explained. Finally, a flow of calibration before shipment of the robot and in respective phases of setting, actual work, and the like is explained.

2. System Configuration Examples

A system configuration example of the robot according to this embodiment is explained. The robot according to this embodiment includes, as shown in FIG. 1, the robot control unit 100 and the robot mechanism 300. In the example shown in FIG. 1, the robot mechanism 300 includes the arm 310 and the end effector 319 provided at the distal end or the like of the arm 310. The end effector 319 may be a hand that grips a workpiece or may be a tool or the like attached to the arm 310.

Figure 2:
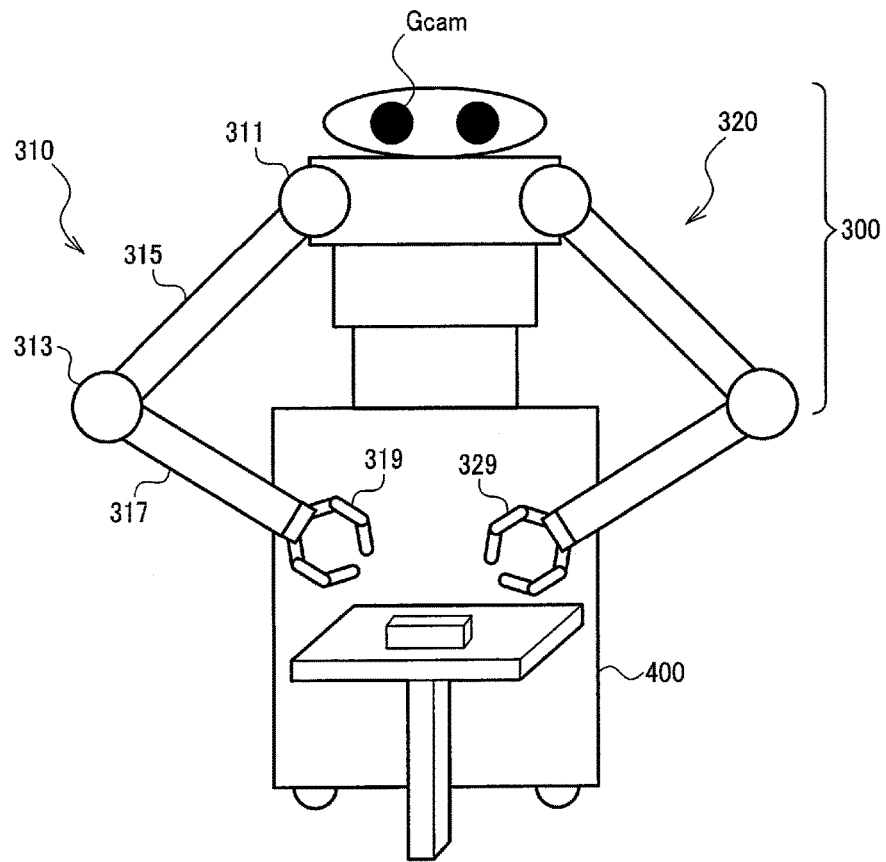
FIG. 2 is another configuration example of the robot according to the embodiment.

However, a configuration example of the robot according to this embodiment is not limited to the example shown in FIG. 1. For example, as shown in FIG. 2, the robot may include the robot mechanism 300 and a base unit section 400. The robot mechanism 300 shown in FIG. 2 includes a first arm 310 and a second arm 320 in addition to portions equivalent to a head and a body. In FIG. 2, the first arm 310 is configured from joints 311 and 313 and frames 315 and 317 provided between the joints. The second arm 320 is configured the same. However, the configuration of the arms is not limited to this. Note that, in FIG. 2, an example of a double-arm robot including two arms is shown. However, the robot in this embodiment may include three or more arms.

The base unit section 400 is provided below the robot mechanism 300 and supports the robot mechanism 300. In the example shown in FIG. 2, wheels or the like are provided in the base unit section 400. The entire robot is configured to be movable. However, the base unit section 400 may be configured to be fixed to a floor surface or the like without including the wheels or the like. In the robot shown in FIG. 2, a control apparatus (the robot control unit 100) is housed in the base unit section 400, whereby the robot mechanism 300 and the control apparatus are configured as one unit.

As shown in FIG. 2, the robot according to this embodiment may include a global camera Gcam provided in the head. In the example shown in FIG. 2, the global camera Gcam is assumed to be a stereo camera. In FIG. 2, a gripping section including a finger structure is shown as the end effector 319. However, a hand-eye camera Hcam may be used as the end effector 319. Alternatively, both of the gripping section and the hand-eye camera Hcam may be provided in one arm.

Besides, various modified implementations of the components of the robot mechanism included in the robot in this embodiment are possible.

Figure 3:
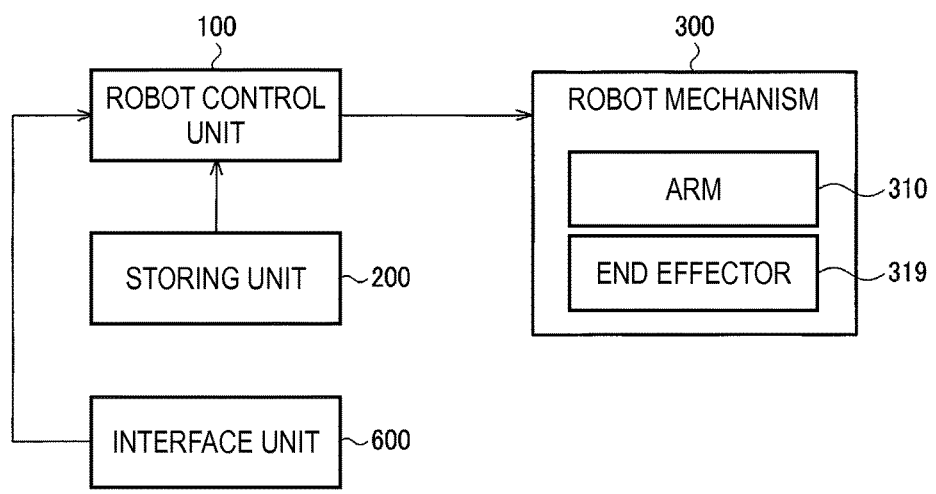
FIG. 3 is a detailed configuration example of the robot according to the embodiment.

A detailed system configuration example of the robot according to this embodiment is shown in FIG. 3. As shown in FIG. 3, the robot includes the robot control unit 100, a storing unit 200, the robot mechanism 300, and the interface unit 600.

The storing unit 200 functions as a work area of the robot control unit 100 or the like. The function of the storing unit 200 can be realized by a memory such as a RAM, a HDD (hard disk drive), or the like. The storing unit 200 stores information concerning correction of a joint of the robot representing a result of correction (e.g., calibration information). The joint of the robot refers to a portion in which an actuator for driving the robot is incorporated.

The information concerning the correction of the joint of the robot only has to be information representing a result of calibration as explained above. A form of the information may be any form. For example, it is assumed that, in an ideal robot model, when a predetermined joint angle is set to x degrees, a finger position of the robot is in a desired position but, as a result of calibration, it is seen that, in an actual robot, when the joint angle is set to x' degrees, the finger position of the robot is in the desired position. In this case, it is possible to perform desired control by shifting the joint angle by x'−x from an ideal value. Therefore, an amount of the shift is the information concerning the correction.

In view of the above, when calibration is skipped in the method in this embodiment, it is natural to divert a result of calibration performed before. Calibration information is stored in the storing unit 200. When the calibration is unnecessary in the i+1-th work, the robot control unit 100 performs the i+1-th work using correction information (calibration information) used in the i-th work.

The interface unit 600 receives an information input from the user. The information input received by the interface unit 600 may be information concerning whether the calibration is necessary. In that case, the robot control unit 100 determines on the basis of the information input to the interface unit 600 whether the calibration is necessary or unnecessary.

For example, the robot control unit 100 may automatically determine whether the calibration is necessary and leave final determination to the user while presenting a result of the determination to the user as reference information. In that case, the interface unit 600 receives an information input concerning whether the calibration is executed and determines, according to the input, whether the calibration is necessary. Note that an example of a method of automatically determining whether the calibration is necessary is explained below. It is also possible that the robot control unit 100 does not perform the automatic determination and the interface unit 600 receives, from the user, the information input concerning whether the calibration is executed. The interface unit 600 is realized by, for example, an operation unit 610, a display unit 620, and the like shown in FIG. 1.

Note that the image pickup unit used for the visual servo control (in a broad sense, the image pickup unit that performs image pickup a plurality of times during robot work in order to control the robot) may be an image pickup unit attached to the robot. Specifically, the global camera Gcam and the hand-eye camera Hcam may be used for the visual servo control. However, it is also possible that the global camera Gcam and the hand-eye camera Hcam included in the robot are not used for the visual servo control and an image pickup unit provided on the outside of the robot is used for the visual servo control. In this case, the method in this embodiment is realized by a robot control system including the image pickup unit that acquires a picked-up image for visual servo.

The method in this embodiment can be applied to a control apparatus that actuates a robot that performs, after i-th (i is a natural number) work, i+1-th work different from the i-th work and performs, after j-th (j is a natural number satisfying j≠i) work, j+1-th work different from the j-th work. The control apparatus causes the robot to perform the i+1-th work after the i-th work without changing information concerning correction in a joint of the robot during the i-th work, perform robot calibration after the j-th work, and perform the j+1-th work after performing the robot calibration.

The control apparatus is provided on the outside of the robot and may be, for example, a device including the robot control unit 100, the storing unit 200, and the interface unit 600 of the robot shown in FIG. 3.

The method in this embodiment can be applied to a robot system including a robot that performs, after i-th (i is a natural number) work, i+1-th work different from the i-th work and performs, after j-th (j is a natural number satisfying j≠i) work, j+1-th work different from the j-th work. The robot performs the i+1-th work after the i-th work without changing information concerning correction in a joint of the robot during the i-th work, performs robot calibration after the j-th work, and performs the j+1-th work after performing the robot calibration.

The robot system may include, for example, the robot and the control apparatus. Alternatively, the robot system may include an apparatus other than the control apparatus in addition to the robot.

Specifically, the method in this embodiment can be applied to a robot control system that performs a plurality of kinds of work including at least two or more kinds of work. The robot control system includes the robot mechanism 300, the robot control unit 100, and an image pickup unit 500 that performs image pickup a plurality of times during work of the robot. After k-th work among the plurality of kinds of work, when the robot control unit 100 performs k+1-th work different from the k-th work, if calibration is unnecessary, the robot control unit 100 performs, without performing the calibration, the k+1-th work according to robot control by a plurality of times of image pickup by the image pickup unit 500. If the calibration is necessary, after performing the calibration, the robot control unit 100 performs the k+1-th work according to the robot control by a plurality of times of image pickup by the image pickup unit 500.

Figure 4:
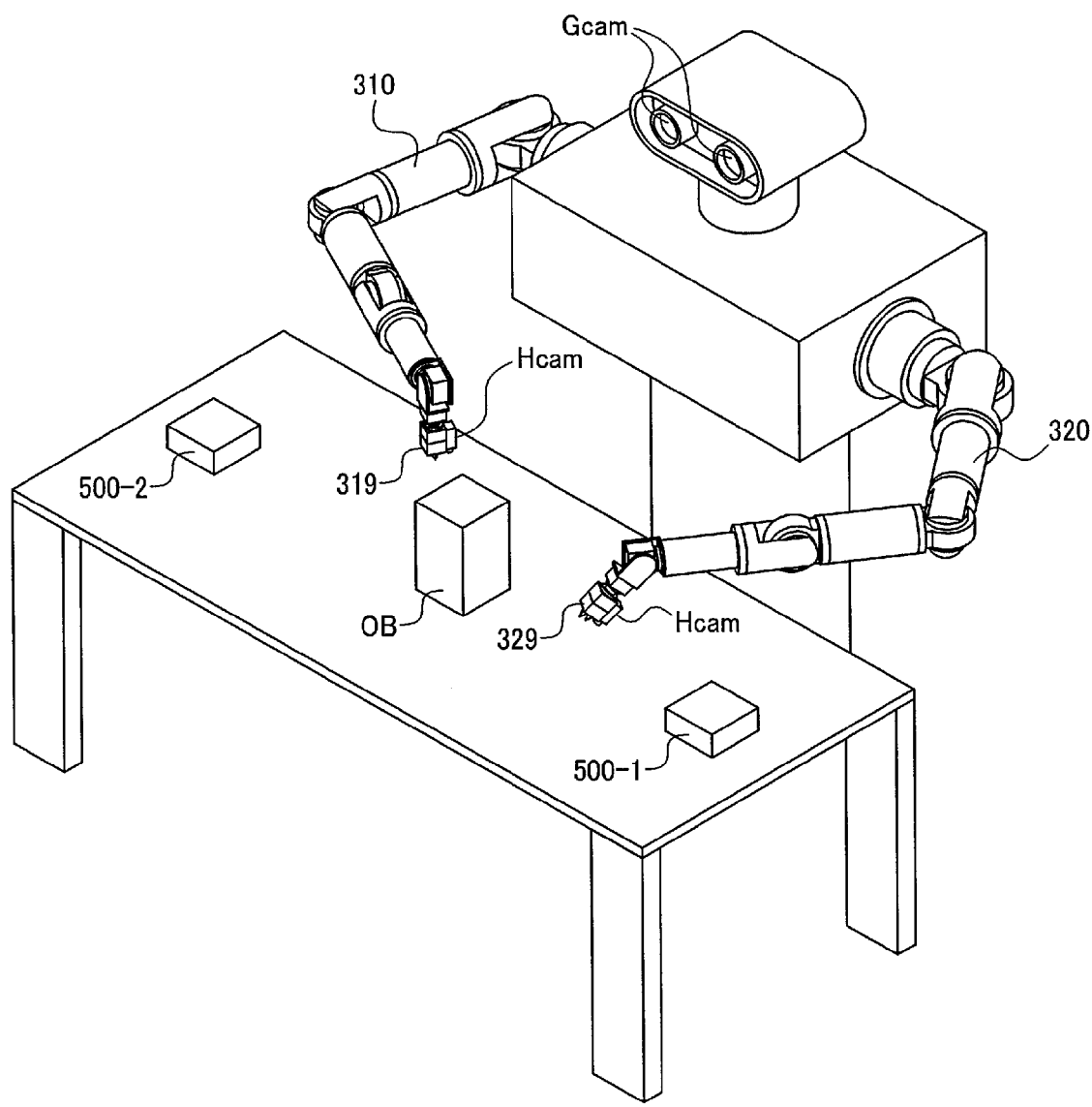
FIG. 4 is an example of arrangement of a robot system including an image pickup unit.

An arrangement example of the image pickup unit 500 in this case is shown in FIG. 4. In the example shown in FIG. 4, a first image pickup unit 500-1 and a second image pickup unit 500-2 are provided as the image pickup unit 500. Both of the first image pickup unit 500-1 and the second image pickup unit 500-2 are placed on a workbench. However, the image pickup unit 500 is not limited to the example shown in FIG. 4. An arrangement position of the image pickup unit 500, the number of image pickup units, and the like may be changed.

3. Calibration

Details of calibration in this embodiment are explained. As the calibration, robot calibration and camera calibration are conceivable. As the calibration, there are strict calibration at micrometer accuracy or higher accuracy and simplified calibration at accuracy in millimeter units. In this embodiment, any one of these kinds of calibration may be used. The strict calibration is performed by a user having expert knowledge (a system integrator, etc.) or performed by a user not having expert knowledge consuming large manhour. On the other hand, the simplified calibration can be realized by the user not having expert knowledge in relatively small man-hour. Details of the respective kinds of calibration are explained below.

3.1 Robot Calibration

First, the robot calibration is explained. As explained above, the robot calibration is processing for calculating a correspondence relation between a robot base coordinate system (an ideal space) and a robot finger coordinate system (a measurement space).

As explained above, a shift between the robot base coordinate system and the robot finger coordinate system is caused by a geometrical error factor and a non-geometrical error factor. The geometrical error factor is a manufacturing error during element machining of the robot mechanism, a dimension error during assembly, and the like. Specifically, besides the link length, shifts of a position between adjacent joints set on the link and a torsion angle, shifts of offset values of joint angles, and the like are conceivable. As the non-geometrical error factor, besides the bend due to the gravity or the like, a transmission error between gears, a backlash in the gears, and the like are conceivable.

When robot calibration is performed, values of joint angles (or, for example, driving amounts of actuators that drive joints) at the time when a finger position is moved to a given position of the robot finger coordinate system using an actual robot only have to be calculated. If the values of the joint angles are determined, a finger position (a finger position in an ideal case) in the robot base coordinate system is calculated from a model of the robot. Therefore, it is possible to calculate the correspondence relation between the robot finger coordinate system and the robot base coordinate system.

To calculate the correspondence relation, it is necessary to calculate a pair of a joint angle and a finger position. As an example, a jig positioned at high accuracy is created. The finger position only has to be adjusted to the jig. Consequently, since the finger position adjusted to the jig is known, if a value of the joint angle at that point is read, it is possible to calculate the pair of the finger position and the joint angle. Alternatively, control may be performed to set the joint angle to a given joint angle. A three-dimensional position of the finger at that time may be measured. Specifically, the finger position only has to be calculated by, for example, a distance measuring method for measuring a distance using ultrasound, a method of measuring a distance using a surveying machine, a method of providing an LED or the like in the finger, detecting the LED, and measuring a distance, or a method of measuring a distance using a mechanical three-dimensional measuring device. In this case, since a joint angle is known, the joint angle and the measured finger position only have to be set as a pair.

3.2 Camera Calibration

Figure 5:
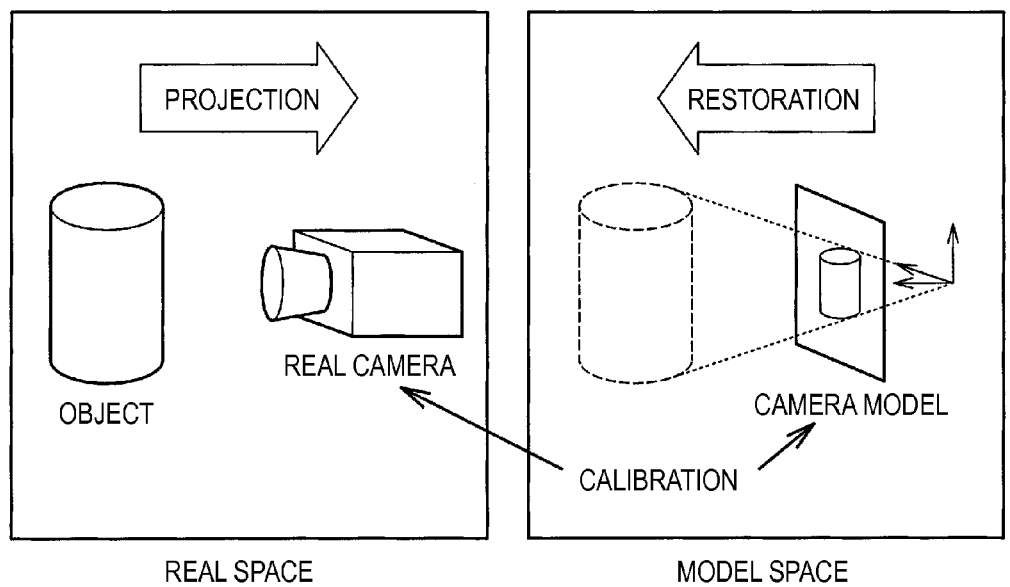
FIG. 5 is a conceptual diagram of camera calibration.

The camera calibration, which is calibration concerning a camera, is explained. The camera calibration is processing for associating a camera in a real world and a camera model as shown in FIG. 5. If the association is accurately performed, it is possible to, for example, calculate, on the basis of a picked-up image, a three-dimensional position in the real world of an object picked up in the picked-up image.

For example, the global camera Gcam shown in FIG. 2 sometimes performs recognition processing of a target object such as a workpiece arranged on the workbench and recognizes the position of the target object (in a narrow sense, a relative position with respect to the robot). In that case, it is conceivable to move the end effector 319 to the recognized position and perform work. Therefore, in order to accurately perform the work, it is necessary to accurately calculate a position from a picked-up image. In order to accurately calculate a position, the camera calibration is necessary.

Targets to be calculated by the camera calibration are elements that affect, when an image of a given object is picked up, a position posture (including size) of the object on the image. The elements can be classified into external parameters and internal parameters.

The external parameters are parameters representing a position posture in which a camera is arranged and are, for example, a coordinate of a center position of a lens and a direction of an optical axis of the lens. The internal parameters are parameters determined irrespective of an arrangement position if a camera is determined. For example, a focal length, an image center, an image size (a pixel size), and a distortion aberration coefficient are conceivable.

These kinds of information are set during designing. For example, in the global camera Gcam shown in FIG. 2, a position with respect to the robot (e.g., a coordinate value in the robot base coordinate system) and a direction of an optical axis are known. Information such as a focal length is also known from the specifications of the cameras. However, as in the robot model in the robot calibration, those are values in an ideal state and errors could occur. Therefore, the camera calibration is necessary.

Figure 6:
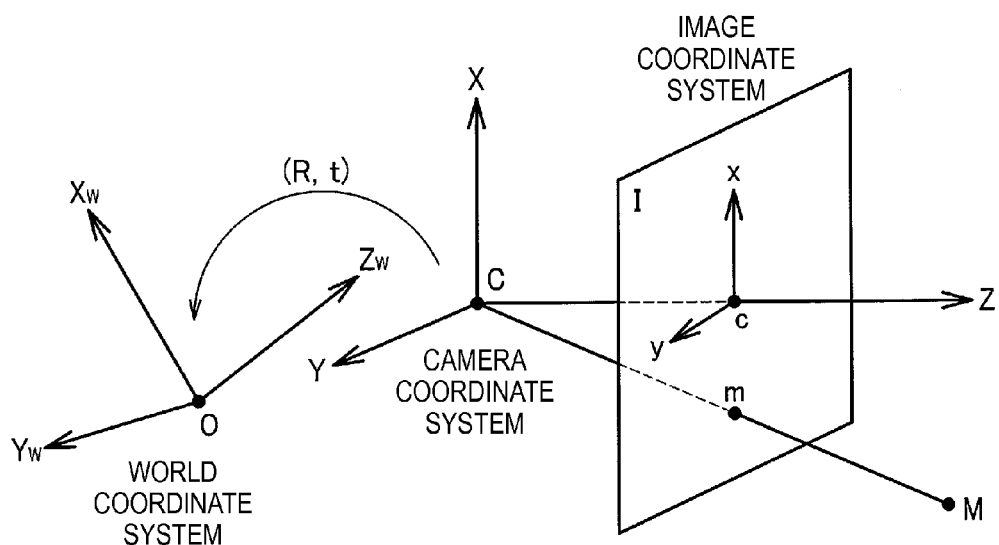
FIG. 6 is a relation of coordinate systems in the camera calibration.

As shown in FIG. 6, the camera calibration can be considered processing for calculating a relation between a world coordinate system and an image coordinate system. The relation can be calculated if a relation between the world coordinate system and a camera coordinate system and a relation between the camera coordinate system and the image coordinate system are calculated. The external parameters are parameters representing the relation between the world coordinate system and the camera coordinate system. The internal parameters are parameters representing the relation between the camera coordinate system and the image coordinate system.

Specifically, an image of a target object, a geometrical characteristic and an optical characteristic of which are known, is picked up. Characteristics peculiar to the target object and image characteristics are associated with each other. This association can be realized by, for example, processing for associating a coordinate value of a feature point in the global coordinate system and a coordinate value in the image coordinate system corresponding to the feature point. Thereafter, parameters are estimated on the basis of the camera model. As a more specific method, various methods are known as the camera calibration. Since the methods are widely applicable to the camera calibration in this embodiment, detailed explanation of the methods is omitted.

Among the image pickup units used in this embodiment, the global camera Gcam shown in FIG. 2 and the hand-eye camera Hcam are likely to be used for, for example, position recognition of an object as explained above. Therefore, for the global camera Gcam and the hand-eye camera Hcam, the camera calibration needs to be performed concerning both of the external parameters and the internal parameters.

On the other hand, the image pickup unit 500 of the robot system shown in FIG. 4 is an image pickup unit for the visual servo. In the visual servo control, it is sufficient that a goal image and a picked-up image can be compared. In principle, it is unnecessary to calculate a three-dimensional position of an object picked up in the picked-up image. Therefore, the camera calibration does not have to be performed concerning the external parameters. On the other hand, the look of the object changes if a lens or the like changes. Therefore, the internal parameters need to be calculated. That is, for an image pickup unit that is for the visual servo and is known not to be used for position recognition and the like such as the image pickup unit 500, the camera calibration targeting the internal parameters only has to be performed. In this specification, in order to distinguish calibration targeting the internal parameters from calibration targeting both of the external parameters and the internal parameters, the calibration targeting the internal parameters is referred to as second camera calibration.

That is, calibration of the camera provided in the robot and calibration of the image pickup unit 500 of the robot system for the visual servo are performed in different viewpoints. Therefore, when the lens of the image pickup unit 500 used for the visual servo control is changed, the robot control unit 100 performs second calibration (the second camera calibration) for the image pickup unit 500 irrespective of whether the calibration (the robot calibration or the camera calibration targeting both of the external parameters and the internal parameters) is necessary or unnecessary. The change of the lens is referred to as a condition for performing the second camera calibration. This is because the second camera calibration targets the internal parameters and the internal parameters include information depending on the lens such as the focal length as explained above.

When the camera calibration is automated, the procedure explained above is executed on the robot side. The calibration of the internal parameters is explained. For example, it is sufficient to automate processing for picking up images of a checkerboard, on which a given pattern is drawn, as images of a target object, a geometrical characteristic and an optical characteristic of which are known, and calculating correspondence among pieces of feature point information of the images. Specifically, the checkerboard is gripped by the end effector 319 (in a narrow sense, a gripping section such as a hand) of the robot. In that state, the robot mechanism 300 is moved to set the checkerboard in various postures and image pickup is performed by the image pickup unit. If the operation of the robot mechanism 300 in this case is set, the camera calibration can be automated. However, like the robot calibration, a start instruction for the calibration (e.g., an instruction issued by the user pressing a start button of the interface unit 600) needs to be performed by the user.

4. Flow of the Calibration

Figure 7:
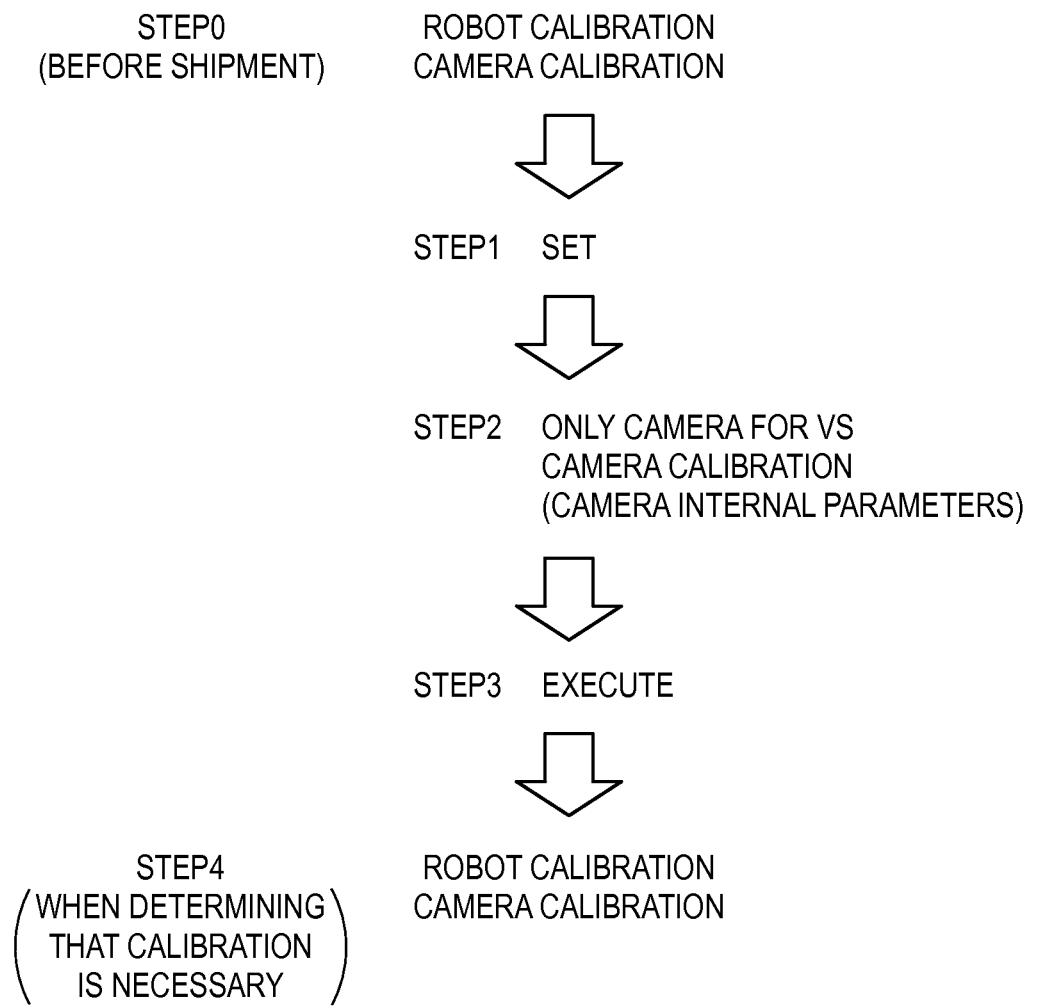
FIG. 7 is a diagram for explaining a flow of calibration.
Figure 8:
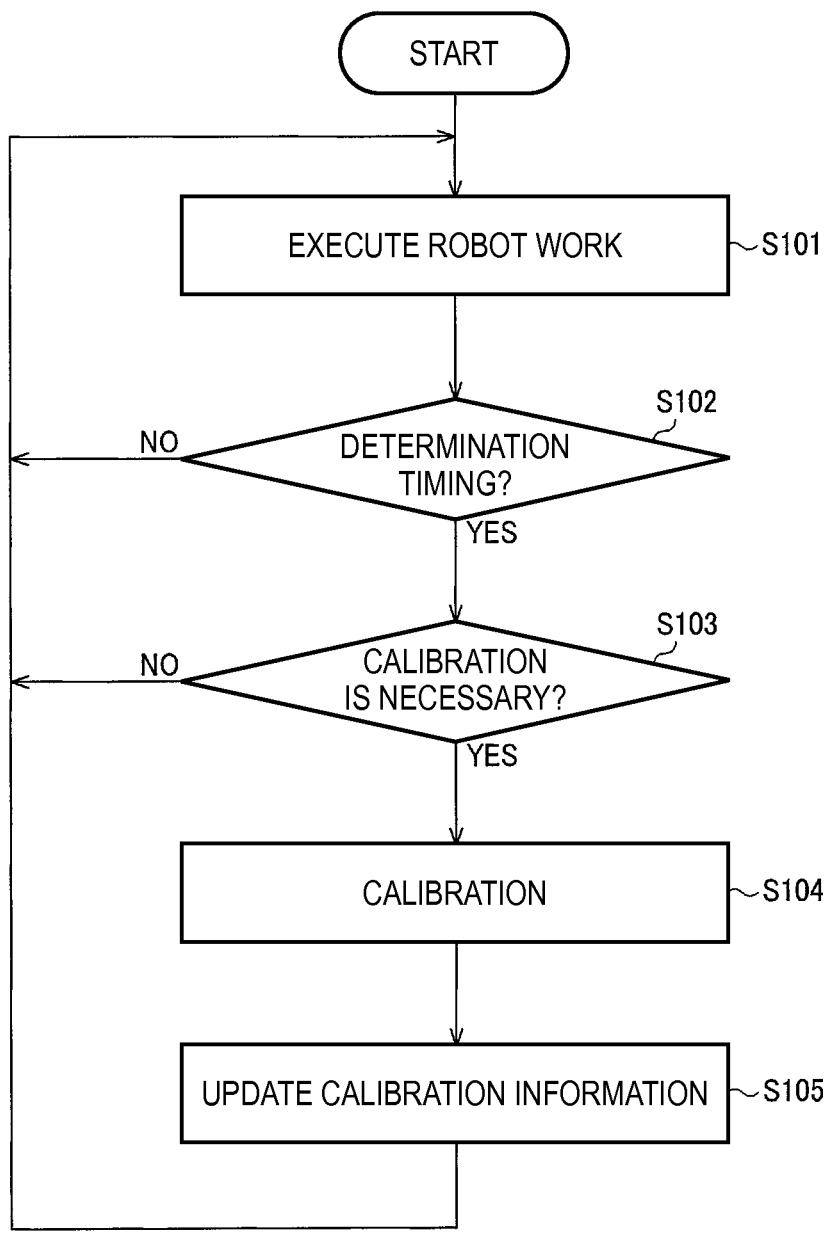
FIG. 8 is a flowchart for explaining processing in the embodiment.

It is explained phase by phase in what kind of a flow the calibration concerning the robot according to this embodiment is performed. Note that FIG. 8 is a processing flow of the robot (the robot control unit 100). However, FIG. 7 is a diagram for explaining a flow of the calibration and also includes acts performed by the user. Therefore, FIG. 7 does not represent the processing flow of the robot.

As shown in FIG. 7, in STEP 0 corresponding to a phase before shipment of the robot, the robot calibration and the camera calibration are performed by a manufacturer of the robot. Calibration performed in this phase is calibration performed before setting of the robot in a work space. Therefore, the calibration is also referred to as pre-setting calibration. That is, the pre-setting calibration is the robot calibration and the camera calibration.

The camera calibration in the pre-setting calibration is calibration for the image pickup units (the global camera Gcam and the hand-eye camera Hcam) provided in the robot. The camera calibration targets both of the external parameters and the internal parameters. The pre-setting calibration is also performed by the robot in the past. The storing unit 200 stores a result of the pre-setting calibration as calibration information.

After the pre-setting calibration is performed, shipment of the robot is performed. In STEP 1, the robot is set in an operation position in a factory or the like. Thereafter, before the operation of the robot is executed, in STEP 2, the camera calibration of the camera used for the visual servo control is executed. The camera calibration is the second camera calibration targeting the internal parameters as explained above. The second camera calibration and the pre-setting calibration are divided because it is assumed that the robot and the image pickup unit 500 for the visual servo are separately sold. In this case, the robot manufacturer cannot perform the second camera calibration. Therefore, the user performs the second camera calibration after the setting. Alternatively, even if the robot manufacturer sells the robot together with the image pickup unit 500 for the visual servo, the robot manufacturer sometimes causes the user to prepare a lens or enables the user to freely replace the lens. Even in that case, the robot manufacturer cannot perform the calibration concerning the internal parameters. Therefore, the second camera calibration is performed by the user. That is, if an image pickup unit including a lens prepared by the manufacturer is directly used as the image pickup unit 500 for the visual servo, in STEP 0, the manufacturer may perform the second camera calibration as well.

In STEP 3, the robot is actually actuated. In this embodiment, for example, since the visual servo control is performed, even if the calibration after the setting is skipped and a result of the pre-setting calibration is directly used, positioning at high accuracy is considered to be possible.

The storing unit 200 stores, as calibration information, a result of the pre-setting calibration performed before the setting of the robot in the work space. In first work among the plurality of kinds of work, the robot control unit 100 reads out, without performing the calibration, the calibration information stored in the storing unit 200 and performs the first work according to robot control by a plurality of times of image pickup by the image pickup unit (in a narrow sense, the image pickup unit 500 shown in FIG. 4) during robot work.

Specifically, the first work is work performed for the first time after the setting of the robot. However, the first work is not limited to this. The result of the pre-setting calibration may be directly used after the setting as long as error factors such as collision and toppling of the robot are not changed, for example, in transportation from the manufacture to a factory or the like of the user and setting work of the robot in a user environment. In this case, for the user, if the user simply sets the purchased robot, the user can cause the robot to execute work without performing complicated calibration. It is possible to realize an extremely user-friendly robot. However, if the collision or the like occurs, when the result of the pre-setting calibration is diverted, it is likely that an error that cannot be fully absorbed even by the visual servo control could occur. That is, an effect of capable of skipping the calibration in the first work is large. However, the calibration is not always skipped. The calibration may be executed when necessary.

While the execution of the robot operation in STEP 3 is repeated, when it is determined that the calibration is necessary, the robot calibration and the camera calibration are executed in STEP 4.

Specifically, in the i+1-th work, when it is determined that the calibration is necessary, the robot control unit 100 performs, as the calibration, the post-setting calibration different from the pre-setting calibration, updates the calibration information, and performs, using the calibration information after the update, the i+1-th work according to robot control by a plurality of times of image pickup by the image pickup unit during robot work.

The pre-setting calibration is performed on the robot manufacturer side before the setting of the robot. On the other hand, the post-setting calibration is performed by the user, who purchases the robot, after the setting of the robot. Therefore, the post-setting calibration is calibration different from the pre-setting calibration in terms of execution timing and an execution entity. That is, as a calibration method itself, the same calibration method is not prevented from being used in the pre-setting calibration and the post-setting calibration. However, since the pre-setting calibration can be performed in a certain determined environment (a workbench, environmental light, and the like are known), for example, accuracy of marker recognition and checkerboard recognition is high. Even if a jig is set on the workbench, calibration accuracy is deteriorated when the workbench slightly moves. However, in the pre-setting calibration, the manufacturer side can prepare an accurate (stable) workbench. That is, even if the calibration method is set the same, concerning accuracy of the calibration method, a difference occurs in that the accuracy is higher before the setting than after the setting.

That is, basically, as explained in STEP 3, the robot control unit 100 executes the work by the robot while skipping the calibration and performs the calibration as explained in STEP 4 according to necessity to update the calibration information. After the update, the robot control unit 100 only has to return to STEP 3 and execute the work by the robot using the calibration information after the update.

Processing flow of the robot in STEP 3 and STEP 4 is shown in FIG. 8. A flowchart of FIG. 8 is based on the premise that the result of the pre-setting calibration is acquired as the calibration information. When this processing is started, first, the robot control unit 100 performs the first work using the acquired calibration information (S101). However, as explained above, before S101, a step of determining whether the calibration is necessary and performing the calibration according to necessity may be added.

After the robot work, the robot control unit 100 determines whether timing for determining whether the calibration is necessary or unnecessary (hereinafter also referred to as necessity determination) is now (S102). In an example of the flowchart of FIG. 8, it is assumed that, rather than performing the necessity determination every time after the execution of the robot work, the robot control unit 100 performs the necessity determination after the end of K times (K is an integer equal to or larger than 2) of work or performs the necessity determination after a given time elapses. However, the robot control unit 100 may perform the necessity determination for the calibration every time the work ends once. In that case, step S102 can be omitted. Besides, various modified implementations are possible concerning at which timing and at which degree of a frequency the necessity determination is performed.

When determining NO in S102, the robot control unit 100 returns to S101 without performing the calibration and continues the robot work by diverting the calibration information up to that point. On the other hand, when determining YES in S102, the robot control unit 100 performs the necessity determination for the calibration (S103).

As explained above, the user may perform the necessity determination for the calibration and input information representing a result of the necessity determination via the interface unit 600. In that case, S103 is processing for receiving the input of the user with the interface unit 600 and performing control according to the input. Alternatively, the necessity determination for the calibration may be automatically performed on the robot side (in a narrow sense, the robot control unit 100).

As a condition of the necessity determination for the calibration, for example, when i-th work and i+1-th work different from the i-th work can be considered substantially the same work, it is determined that the calibration is unnecessary. On the other hand, for example, when the i+1-th work is performed near a boundary of an operation region of the robot, it is determined that the calibration is necessary.

When determining in S103 that the calibration is unnecessary, the robot control unit 100 returns to S101 and continues the robot work without performing the calibration. On the other hand, when determining in step S103 that the calibration is necessary, the robot control unit 100 executes the calibration (S104) and updates the calibration information using a result of the execution (S105). After S105, the robot control unit 100 returns to S101 and executes the robot work using the calibration information after the update.

Note that, in this embodiment, as the robot control, the example of the visual servo control performed using the picked-up image picked up by the image pickup unit is explained. However, the robot control is not limited to this. For example, as explained above, it is also possible that a force sensor is provided in the end effector, a force applied to the end effector is detected by the force sensor, and the robot control is performed on the basis of a result of the detection.

A part or most of the processing by the robot control unit 100 and the like in this embodiment may be realized by a computer program. In this case, a processor of a CPU or the like executes the computer program, whereby the robot control unit 100 and the like in this embodiment are realized. Specifically, the computer program stored in a non-transitory information storage medium is read out and the processor of the CPU or the like executes the read-out computer program. The information storage medium (a computer-readable medium) stores computer programs, data, and the like. The function of the information storage medium can be realized by an optical disk (a DVD, a CD, etc.), a HDD (hard disk drive), a memory (a card-type memory, a ROM, etc.), or the like. The processor of the CPU or the like performs the various kinds of processing in this embodiment on the basis of the computer programs (the data) stored in the information storage medium. That is, computer programs for causing a computer (an apparatus including an operation unit, a processing unit, a storing unit, and an output unit) to function as the units in this embodiment (computer programs for causing the computer to execute the processing by the units) are stored in the information storage medium.

This embodiment is explained in detail above. However, those skilled in the art could easily understand that various modifications not substantially departing from the new matters and the effects of the invention are possible. Therefore, all of such modifications are deemed to be included in the scope of the invention. For example, terms described together with broader-sense or synonymous different terms at least once in the specification or the drawings can be replaced with the different terms in any place of the specification or the drawings. The configurations and the operations of the robot, the robot control system, and the like are not limited to the configurations, the operations, and the like explained in this embodiment. Various modified implementations are possible.

The entire disclosure of Japanese Patent Application No. 2013-229059, filed Nov. 5, 2013 is expressly incorporated by reference herein.

What is claimed is:

1. A robot that performs i+1-th work after performing i-th work, wherein the i-th work being different from the i+1-th work, that determines whether a robot calibration was performed between the i-th work and the i+1-th work, and, in response to a determination that the robot calibration was not performed between the i-th work and the i+1-th work, the robot performs the i+1-th work by visual servo.

2. The robot according to claim 1, wherein the robot performs j+1-th work after performing j-th work that is different from the j+1-th work,
   i and j are both natural numbers and j is not equal to i, and
   when the robot calibration is performed between the j-th work and the j+1-th work, the robot performs the j+1-th work without visual servo.

3. A control apparatus that actuates a robot that performs i+1-th work after performing i-th work, wherein the i-th work being different from the i+1-th work, that determines whether a robot calibration was performed between the i-th work and the i+1-th work, and, in response to a determination that the robot calibration was not performed, between the i-th work and the i+1-th work, the control apparatus controls the robot to perform the i+1-th work by visual servo.

4. The control apparatus according to claim 3, wherein the control apparatus is configured to actuate the robot to perform j+1-th work after actuating the robot to perform j-th work that is different from the j+1-th work,
   i and j are both natural numbers and j is not equal to i, and
   when the control apparatus determines that the robot calibration is to be performed between the j-th work and the j+1-th work, the control apparatus instructs the robot to perform the j+1-th work without visual servo.

5. A robot control method comprising:
   performing i-th work;
   after performing the i-th work, performing i+1-th work, the i-th work being different from the i+1-th work;
   determining whether a robot calibration was performed between the i-th work and the i+1-th work; and
   in response to a determination that the robot calibration was not performed between the i-th work and the i+1-th work, performing the i+1-th work by visual servo.

6. The robot control method according to claim 5, further comprising:
   performing j-th work;
   performing j+1-th work after performing the j-th work, the j-th work being different from the j+1-th work, i and j are both natural numbers, and j is not equal to i; and
   when the robot calibration is performed between the j-th work and the j+1-th work, performing the j+1-th work without visual servo.

* * * * *